United States Patent
Grimes et al.

(10) Patent No.: US 7,245,316 B2
(45) Date of Patent: Jul. 17, 2007

(54) METHOD AND SYSTEM FOR MAINTAINING EVEN TUBE BURN-IN

(75) Inventors: Kevin Lloyd Grimes, Fishers, IN (US); Charles William Worrell, Carmel, IN (US)

(73) Assignee: Thomson Licensing, Boulogne, Billancourt (FR)

( * ) Notice: Subject to any disclaimer, the term of this patent is extended or adjusted under 35 U.S.C. 154(b) by 367 days.

(21) Appl. No.: 10/056,914

(22) Filed: Jan. 25, 2002

(65) Prior Publication Data

US 2003/0142212 A1    Jul. 31, 2003

(51) Int. Cl.
    H04N 3/20    (2006.01)
(52) U.S. Cl. .................. 348/173; 348/445; 348/556; 348/558; 348/563
(58) Field of Classification Search .............. 348/173, 348/445, 556, 558, 913; H04N 3/20
    See application file for complete search history.

(56) References Cited

U.S. PATENT DOCUMENTS

| | | | |
|---|---|---|---|
| 4,670,784 A | 6/1987 | Goldberg | |
| 4,928,182 A | 5/1990 | Guerinot et al. | |
| 5,193,006 A | 3/1993 | Yamazaki | |
| 5,249,049 A | 9/1993 | Kranawetter et al. | |
| 5,287,109 A * | 2/1994 | Hesse | 341/176 |
| 5,291,295 A | 3/1994 | Srivastava | |
| 5,309,234 A | 5/1994 | Kranawetter et al. | |
| 5,345,270 A | 9/1994 | Saeger et al. | |
| 6,169,543 B1 | 1/2001 | Wehmeyer | |
| 6,262,772 B1 * | 7/2001 | Shen et al. | 348/445 |
| 6,313,878 B1 * | 11/2001 | Jankowiak | 348/377 |
| 6,323,915 B1 * | 11/2001 | Marflak et al. | 348/704 |
| 6,359,398 B1 * | 3/2002 | Nakajima et al. | 315/369 |
| 6,369,851 B1 * | 4/2002 | Marflak et al. | 348/173 |
| 6,429,894 B1 * | 8/2002 | Hicks | 348/173 |
| 6,446,261 B1 * | 9/2002 | Rosser | 725/34 |
| 6,486,900 B1 * | 11/2002 | Shen et al. | 345/867 |
| 6,504,534 B1 * | 1/2003 | Takase et al. | 345/211 |
| 6,747,671 B1 * | 6/2004 | Saito | 345/698 |
| 6,891,564 B2 * | 5/2005 | Fujimori et al. | 348/173 |
| 6,900,830 B2 * | 5/2005 | Okabe | 348/173 |

* cited by examiner

Primary Examiner—Brian P. Yenke
(74) Attorney, Agent, or Firm—Joseph J. Laks; Vincent E. Duffy; Michael A. Pugel

(57) ABSTRACT

An arrangement for maintaining even tube burn-in. The arrangement identifies active and inactive display regions on a display unit when video content is displayed on the display unit. When inactive display regions are identified the arrangement monitors the duration that the active display regions remain active. After the active display regions become inactive and a predetermined time period has passed the arrangement displays a corrective image on the identified inactive regions. The predetermined time period may be set by a user or based on the user's viewing habits.

27 Claims, 7 Drawing Sheets

METHOD AND SYSTEM FOR MAINTAINING EVEN TUBE BURN-IN

FIELD OF THE INVENTION

The present invention relates to receivers capable of presenting video and graphical images having multiple aspect ratios.

BACKGROUND OF THE INVENTION

Some high-end home entertainment systems have display units (e.g., high definition and/or wide screen display units) having an aspect ratio, horizontal width to vertical height, of 16:9. Video signals (i.e., video, graphical and textual data) received from various sources (e.g., broadcast systems, cable systems, satellite systems, DSL systems and the Internet) have varying aspect ratios. Two such aspect ratios are the 4:3 aspect ratio, often associated with conventional sources of video, and the 16:9 aspect ratio, often associated with sources of high definition video. It is desirable for a high-end home entertainment system having a 16:9 aspect ratio display unit to display video signals having 16:9 aspect ratios as well as video signals having aspect ratios other than 16:9 (e.g., video signals having an aspect ratio of 4:3).

One drawback encountered in displaying a 4:3 video signal on a 16:9 display unit is that the entire 16:9 display is not used to display the 4:3 video signal. This will result in an uneven burn-in of the display unit. In other words, the active video region of the 16:9 display unit will burn-in at a different rate than the non-active regions of the 16:9 display unit. Burn-in relates to the phosphor aging of a CRT screen. All phosphors are subject to aging (browning) such that their light output diminishes with use. As a result, a 16:9 display unit that is also used to display 4:3 video will have significant portions of its phosphor display surface that are not activated in the 4:3 display mode. This will eventually result in a difference in brightness across the display that could be very distracting to a viewer.

One approach to achieve even burn-in is to horizontally expand the active video region over the entire display unit (i.e., expand the 4:3 video signal to 16:9 video signal). However, a drawback to using this approach is that the horizontal expansion leads to an undesirable distortion of the active video. For example, the displayed video may appear horizontally stretched.

Another approach to achieve even burn-in is to horizontally and vertically expand the active video over the entire display unit and maintain the proper proportions of the horizontal and vertical resolutions. However, a drawback to this approach is that some video content (e.g., a sport score located in a corner of the active video) will be moved off screen and will not be viewable by a user.

A further approach to achieve even burn-in is to monitor the illumination of the active video region, calculate an average illumination value, and to display side panels on the inactive portions of the 16:9 display at the average illumination value. The display of the side panels then occurs while the user is viewing the display unit. However, a drawback with this approach is that the user may find the display of the side panels to be distracting when the user is viewing an active video on the display unit. Furthermore, even if the side panels are displayed when the display unit is off, a user who is engaged in an activity in the vicinity of the display unit may find the display of the side panels to be bothersome.

The present invention is directed to overcoming these drawbacks.

SUMMARY OF THE INVENTION

Briefly stated, the present invention is directed towards an arrangement for maintaining even tube burn-in. The arrangement identifies active and inactive display regions on a display unit when video content is displayed on the display unit. When inactive display regions are identified the arrangement monitors the duration that the active display regions remain active. After the active display regions become inactive and a predetermined time period has passed the arrangement displays a corrective image on the identified inactive regions. The predetermined time period may be set by a user or based on the user's viewing habits.

DETAILED DESCRIPTION OF THE PREFERRED EMBODIMENT

The characteristics and advantages of the present invention will become more apparent from the following description, given by way of example.

Figure 1:
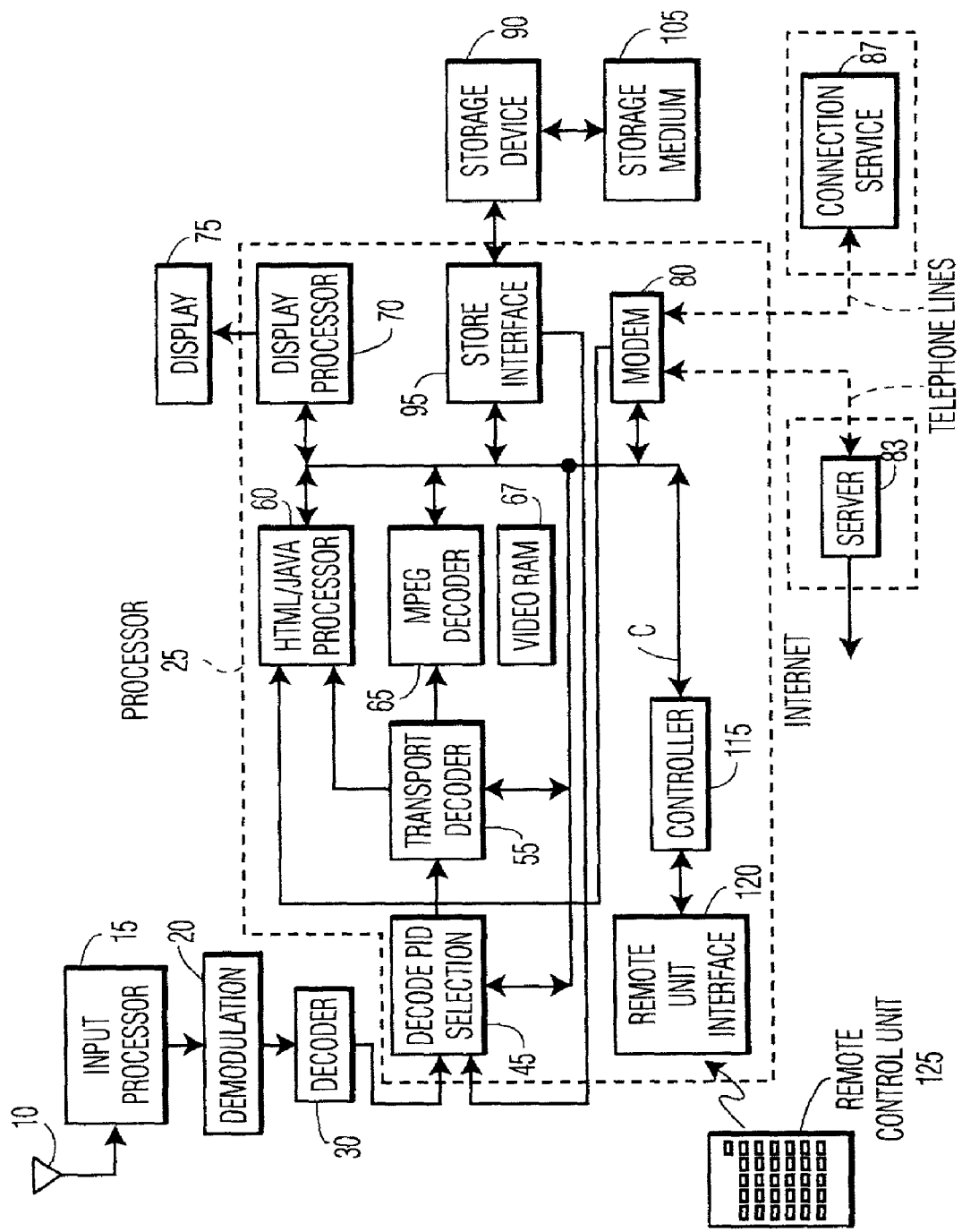
FIG. 1 is a block diagram of an exemplary home entertainment system configured to support the present invention.

Referring to FIG. 1, a block diagram of an exemplary digital video receiving system that operates according to the principles of the invention is shown. The video receiver system includes an antenna 10 and input processor 15 for receiving and digitizing a broadcast carrier modulated with signals carrying audio, video, and associated data, a demodulator 20 for receiving and demodulating the digital output signal from input processor 15, and a decoder 30 outputting a signal that is trellis decoded, mapped into byte length data segments, de-interleaved, and Reed-Solomon error corrected. The corrected output data from decoder unit 30 is in the form of an MPEG compatible transport data stream containing program representative multiplexed audio, video, and data components.

The video receiver system further includes a modem 80 that may be connected, via telephone lines, to a server 83 or connection service 87 such that data in various formats (e.g., MPEG, HTML, and/or JAVA) can be received by the video receiver system over the telephone lines.

A processor 25 processes the data output from decoder 30 and/or modem 80 such that the processed data can be displayed on a display unit 75 or stored on a storage medium 105 in accordance with requests input by a user via a remote control unit 125. More specifically, processor 25 includes a controller 115 that interprets requests received from remote control unit 125 via remote unit interface 120 and appropriately configures the elements of processor 25 to carry out user requests (e.g., channel, website, and/or OSD display). In one exemplary mode, controller 115 configures the elements of processor 25 to provide MPEG decoded data and an OSD for display on display unit 75. In another exemplary mode, controller 15 configures the elements of processor 25 to provide an MPEG compatible data stream for storage on storage medium 105 via storage device 90 and store interface 95. In a further exemplary mode, controller 115 configures the elements of processor 25 for other communication modes, such as for receiving bi-directional (e.g. Internet) communications via server 83 or connection service 87.

Processor 25 includes a decode PID selection unit 45 that identifies and routes selected packets in the transport stream from decoder 30 to transport decoder 55. The transport stream from decoder 30 is demultiplexed into audio, video, and data components by transport decoder 55 and is further processed by the other elements of processor 25, as described in further detail below.

The transport stream provided to processor 25 comprises data packets containing program channel data, ancillary system timing information, and program specific information such as program content rating, program aspect ratio, and program guide information. Transport decoder 55 directs the ancillary information packets to controller 115 which parses, collates, and assembles the ancillary information into hierarchically arranged tables. Individual data packets comprising the user selected program channel are identified and assembled using the assembled program specific information. The system timing information contains a time reference indicator and associated correction data (e.g. a daylight savings time indicator and offset information adjusting for time drift, leap years, etc.). This timing information is sufficient for a decoder to convert the time reference indicator to a time clock (e.g., United States east coast time and date) for establishing a time of day and date of the future transmission of a program by the broadcaster of the program. The time clock is useable for initiating scheduled program processing functions such as program play, program recording, and program playback. The time clock is also usable for monitoring the length of time that video, graphical, and/or textual content is displayed on display unit 75, as discussed in further detail below. Further, the program specific information contains conditional access, network information, and identification and linking data enabling the system of FIG. 1 to tune to a desired channel and assemble data packets to form complete programs. The program specific information also contains ancillary program content rating information (e.g., an age based suitability rating), program aspect ratio (e.g., 4:3 or 16:9 aspect ratio), program guide information (e.g., an Electronic Program Guide—EPG) and descriptive text related to the broadcast programs as well as data supporting the identification and assembly of this ancillary information.

Transport decoder 55 provides MPEG compatible video, audio, and sub-picture streams to MPEG decoder 65. The video and audio streams contain compressed video and audio data representing the selected channel program content. The sub-picture data contains information associated with the channel program content such as rating information, program description information, and the like.

MPEG decoder 65 cooperates with a random access memory (RAM) 67 to decode and decompress the MPEG compatible packetized audio and video data from unit 55 and provides decompressed program representative pixel data to display processor 70. Decoder 65 also assembles, collates and interprets the sub-picture data from unit 55 to produce formatted program guide data for output to an internal OSD module. The OSD module cooperates with RAM 67 to process the sub-picture data and other information to generate pixel mapped data representing subtitling, control, and information menu displays including selectable menu options and other items for presentation on display device 75 in accordance with the present invention. The control and information menus that are displayed enable a user to select a program to view and to schedule future program processing functions including tuning to receive a selected program for viewing, recording of a program onto storage medium 105, and playback of a program from medium 105.

The control and information displays, including text and graphics produced by the OSD module, are generated in the form of overlay pixel map data under direction of controller 115. The overlay pixel map data from the OSD module is combined and synchronized with the decompressed pixel representative data from MPEG decoder 65 under direction of controller 115. Combined pixel map data representing a video program on the selected channel together with associated sub-picture data is encoded by display processor 70 and output to device 75 for display.

The principles of the invention may be applied to terrestrial, cable, satellite, Internet or computer network broadcast systems in which the coding type or modulation format may be varied. Such systems may include, for example, non-MPEG compatible systems, involving other types of encoded data streams and other methods of conveying program specific information. Further, although the disclosed system is described as processing broadcast programs, this is exemplary only. The term 'program' is used to represent any form of packetized data such as audio data, telephone messages, computer programs, Internet data or other communications, for example.

The architecture of FIG. 1 is not exclusive. Other architectures may be derived in accordance with the principles of the invention to accomplish the same objectives. Further, the functions of the elements of processor 25 of FIG. 1 may be implemented in whole or in part within the programmed instructions of a microprocessor. In addition, the principles of the invention apply to any form of MPEG or non-MPEG compatible electronic program guide.

Figure 2:
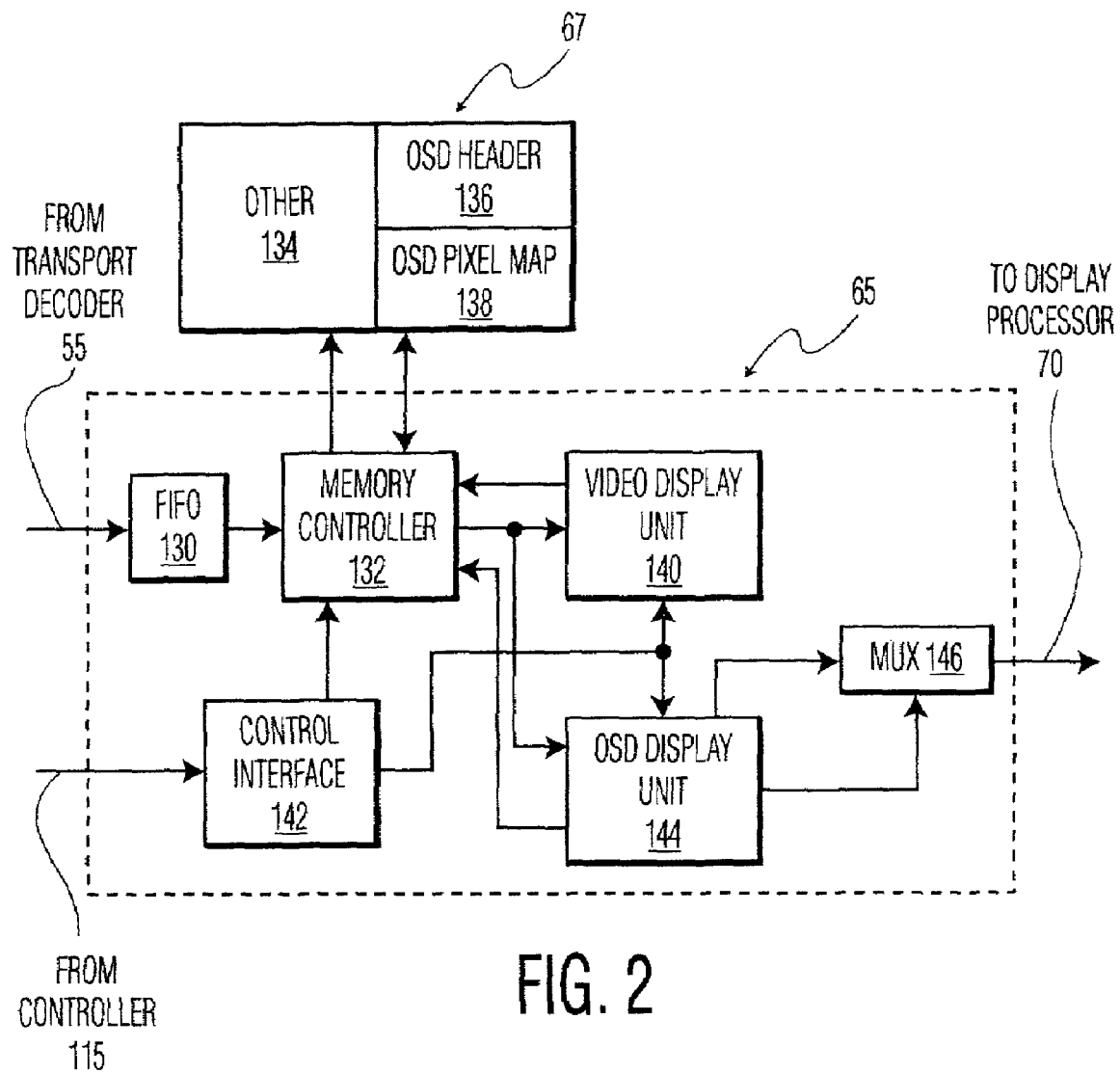
FIG. 2 is a block diagram further illustrating the MPEG decoder and video memory of the exemplary home entertainment system shown in FIG. 1.

Referring now to FIG. 2, MPEG decoder 65 and video RAM 67 are illustrated in further detail. Decoder 65 includes a FIFO buffer memory 130 which receives video data packets on demand in small segments from transport decoder 55 and couples them into relatively larger segments via a memory controller 132 to a section 134 of RAM 67 reserved for decoding and decompression. Video RAM 67 is addressed under the control of memory controller 132. Section 134 of RAM 67 includes a rate buffer section for storing the received video data packets and a frame store section for storing frames of video information during the decoding and decompression operation. A video display unit 140 decodes and decompresses the stored video data packets to form a sequence of video image components. For this purpose, video display unit 140 requests data from the decoding and decompression portion of section 134 via memory controller 132 as required. The sequence of video image components are synchronized with field, line, and pixel rate signals generated by display processor 70. Control data generated by controller 115 is received by controller interface unit 142 and coupled to various elements of MPEG decoder 65 via an internal control bus.

Figure 3:
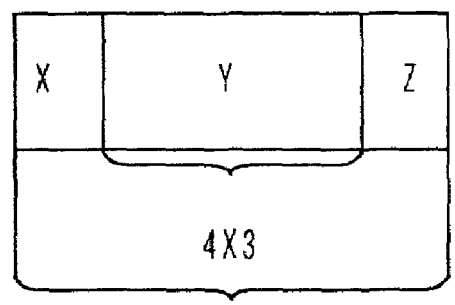
FIG. 3 is an illustration of 4:3 and 16:9 aspect ratios.

The OSD portion of MPEG decoder 65 includes an OSD display unit 144 which communicates with an OSD header memory block 136 and an OSD pixel map or bitmap memory block 138 of RAM 67 via memory controller 132, as discussed in further detail below. Upon initialization of the video receiver, controller 115 generates pixel maps and associated pixel map headers and stores them in OSD pixel map and OSD header blocks of memory 138 and 136 via control interface 142 and memory controller 132. As shown in FIG. 3, one exemplary OSD pixel map used in the present invention is a pixel map having side panels ("X") that are positioned on either side of a 4:3 active video region ("Y"). Another exemplary OSD pixel map (not shown) is a pixel map having top and bottom panels that are positioned on either side of a 16:9 active video region. This alternative pixel map is utilized for corrective burn in after 16:9 content is displayed on a display unit having a 4:3 aspect ratio. Other alternative pixel maps, as known by those skilled in the art, are considered within the scope of the present invention.

An output multiplexer 146, under the control of OSD display unit 144, combines the output of video display unit 140 (video image components) and the output of OSD display unit 144 (graphic image components) and passes the video and graphical combination to display processor 70 for display on display unit 75. It should be noted that if content is only available from video display unit 140 or OSD display unit 144, output multiplexer 146 merely passes the available video or graphical content to display processor 70 for display on display unit 75.

Figure 4:
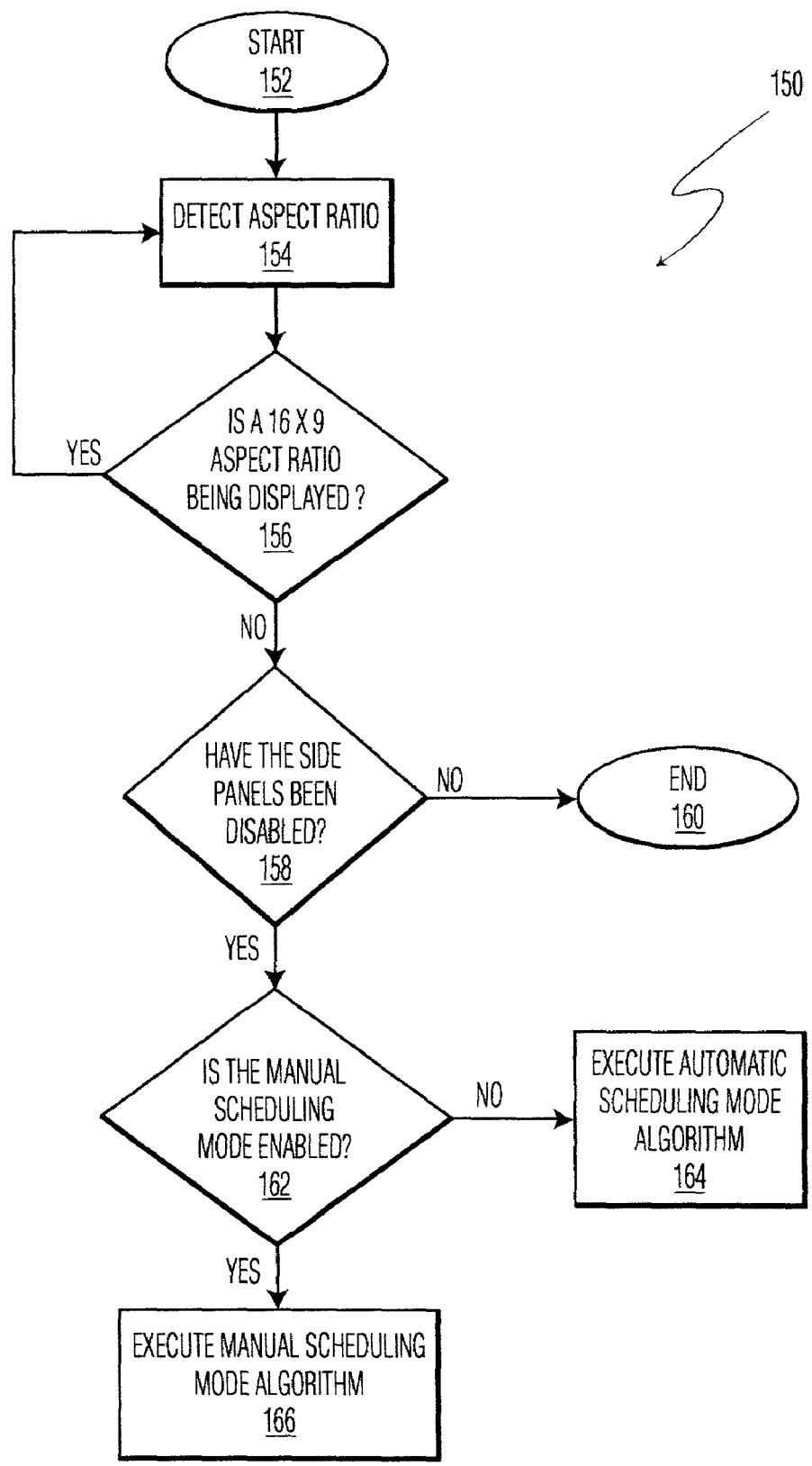
FIG. 4 is a flowchart illustrating the burn-in correction method of the present invention.

Referring now to FIG. 4, at the start up of the home entertainment system of FIG. 1 controller 115, at step 152, starts a burn-in correction process 150. Initially, at step 154, controller 115 detects the aspect ratio of the content (video, graphical, and/or textual) that is being displayed on display unit 75. Controller 115 may detect the aspect ratio of the content being displayed on display unit 75 by receiving an aspect ratio packet from MPEG decoder 65 or HTML/Java Processor 25 that is acquired from the video, graphical, and/or data signal received by antenna 10, modem 80, or storage interface 95. Other known techniques for acquiring an aspect ratio of displayed content is considered within the scope of the invention.

Next, at step 156, controller 115 determines if the detected aspect ratio is a 16:9 aspect ratio. If so, controller 115 returns to step 154 and continues to monitor the aspect ratio of the displayed content. If not, controller 115, at step 158, accesses a local memory (not shown) to determine if the user has disabled the display of side panels if content not having a 16:9 aspect ratio is being displayed on display unit 75. If the side panels have not been disabled controller 115, at step 160, ends the burn-in correction process 150. It should be noted that controller 115 will restart the correction process if the user disables the display of the side panels. If the side panels have been inactivated, controller 115, at step 162, determines if the manual side panel illumination scheduling mode has been enabled. If not, controller 115, at step 164, executes the automatic illumination scheduling mode algorithm shown in FIG. 6. If so, controller 115, at step 166, executes the manual illumination scheduling mode algorithm shown in FIG. 5.

Figure 5:
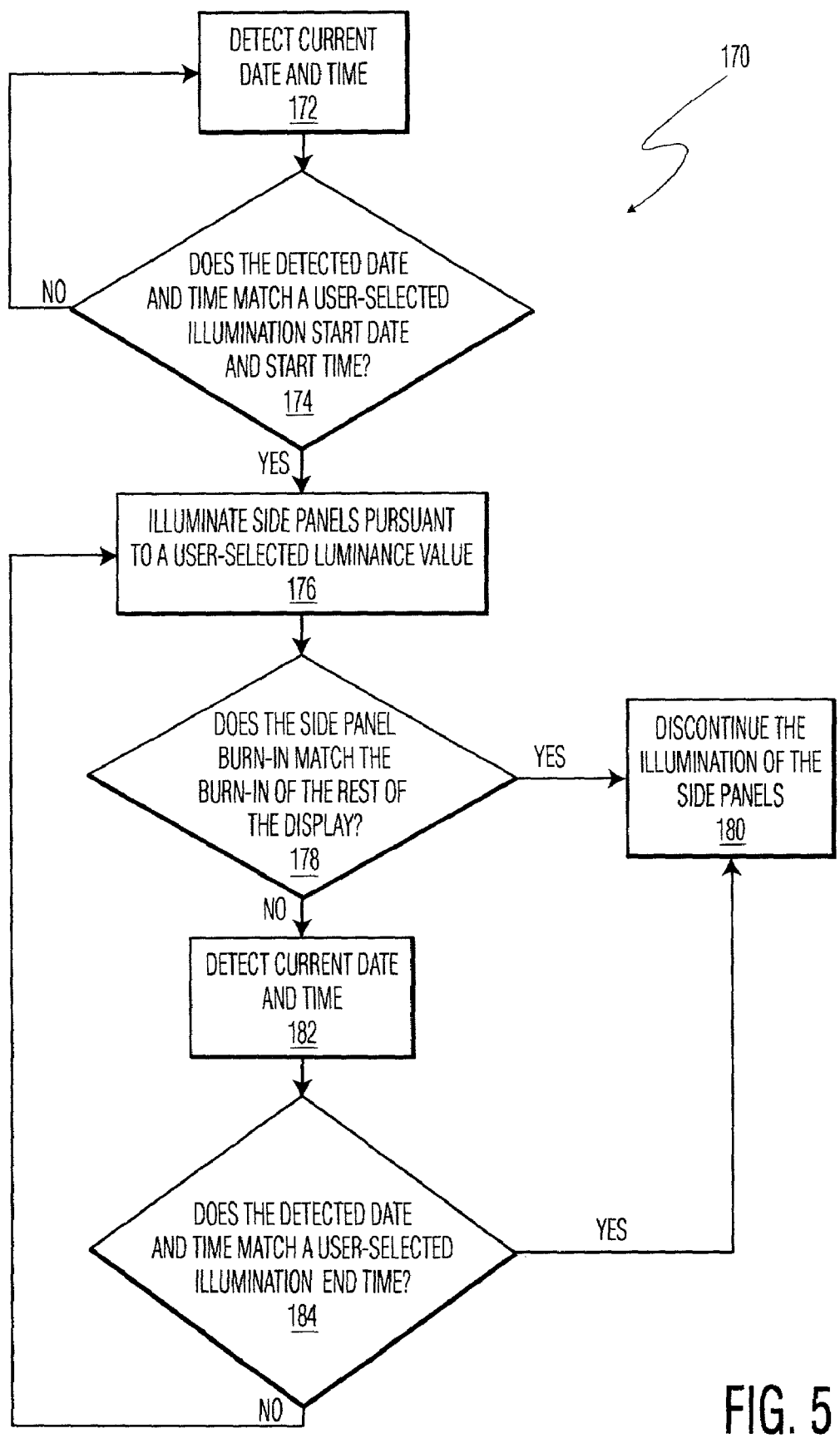
FIG. 5 is a flowchart illustrating the manual scheduling mode algorithm of the present invention.

Referring now to FIG. 5, the manual scheduling mode algorithm 170 of the present invention is shown. Initially, at step 172, controller 115 references an internal clock/calendar (not shown) to detect the current date and time. Next, at step 174, controller 115 determines if the detected date and time matches a user-selected illumination start date and start time. If not, controller 115 returns to step 172 and continues to monitor the current date and time. If so, controller 115, at step 176, transmits a side panel display request to OSD display unit 144 via control interface 142. In response to the side panel display request OSD display unit 144 transmits a header pointer (corresponding to the desired side panel display, discussed below) to the to memory controller 132. Memory controller 132 services the request by retrieving the desired header from OSD header section 136 of video RAM 67 and passing the header data to OSD display unit 144. It should be noted that the retrieved header contains the memory location of an associated side panel pixmap as well as a set of display characteristics that define how the associated pixmap is going to be processed by display processor 70 and displayed on display unit 75. The display characteristics include, but are not limited to, the illumination intensity of the OSD side panels, the use of pixel compression, the number of bits per pixel, YUV or YIQ colorimetry, degree of transparency, OSD size, OSD format (e.g., interlaced or progressive), OSD color scheme, OSD blending ratio, OSD resolution, aspect ratio, horizontal pixel duplication, vertical pixel duplication, OSD screen location. It should be noted that the illumination intensity may be set by the user of the entertainment system (when in manual illumination scheduling mode) or by controller 115 (when in automatic illumination scheduling mode), as discussed in further detail below. OSD display unit 144 analyzes the retrieved header information to determine the location of the pixmap (corresponding to the desired side panel display) stored in OSD pixel map block 138. Afterwards, OSD display unit 144 retrieves, via memory controller 132, the located pixmap from memory 67 and passes the retrieved pixmap and header to display processor 70 via Mux 146. Display processor 70 processes the side panel pixmap in accordance with the display characteristics of the associated OSD header and displays the side panels on display unit 75. Preferably, a text message is also displayed explaining that a corrective side panel display is occurring. The text message is displayed for a short period of time (e.g., two minutes).

Next, at step 178, controller 115 determines if the aging of the display elements being utilized to display the side panels matches the aging of the rest of the display elements (i.e., the display elements used to display the content having a 4:3 aspect ratio). It should be noted that controller 115 stores the "on" time of the display elements in a non-volatile memory such that the aging of all of the display elements of display unit 75 can be tracked. If the aging does match, controller 115, at step 180, discontinues the illumination of the side panels. If the aging does not match, controller 115, at step 182, references an internal clock/calendar (not shown) to detect the current date and time. Next, at step 184, controller 115 determines if the detected date and time matches a user-selected illumination end date and end time. If the end time is reached then controller 115, at step 180, discontinues the illumination of the side panels. It should be noted that controller 115 preferably returns to steps 172 and 174 to determine when the next user-selected illumination start date and start time is reached. If the end time has not been reached then controller 115 returns to step 176 and permits display processor 70 to continue to illuminate the side panels.

Figure 6:
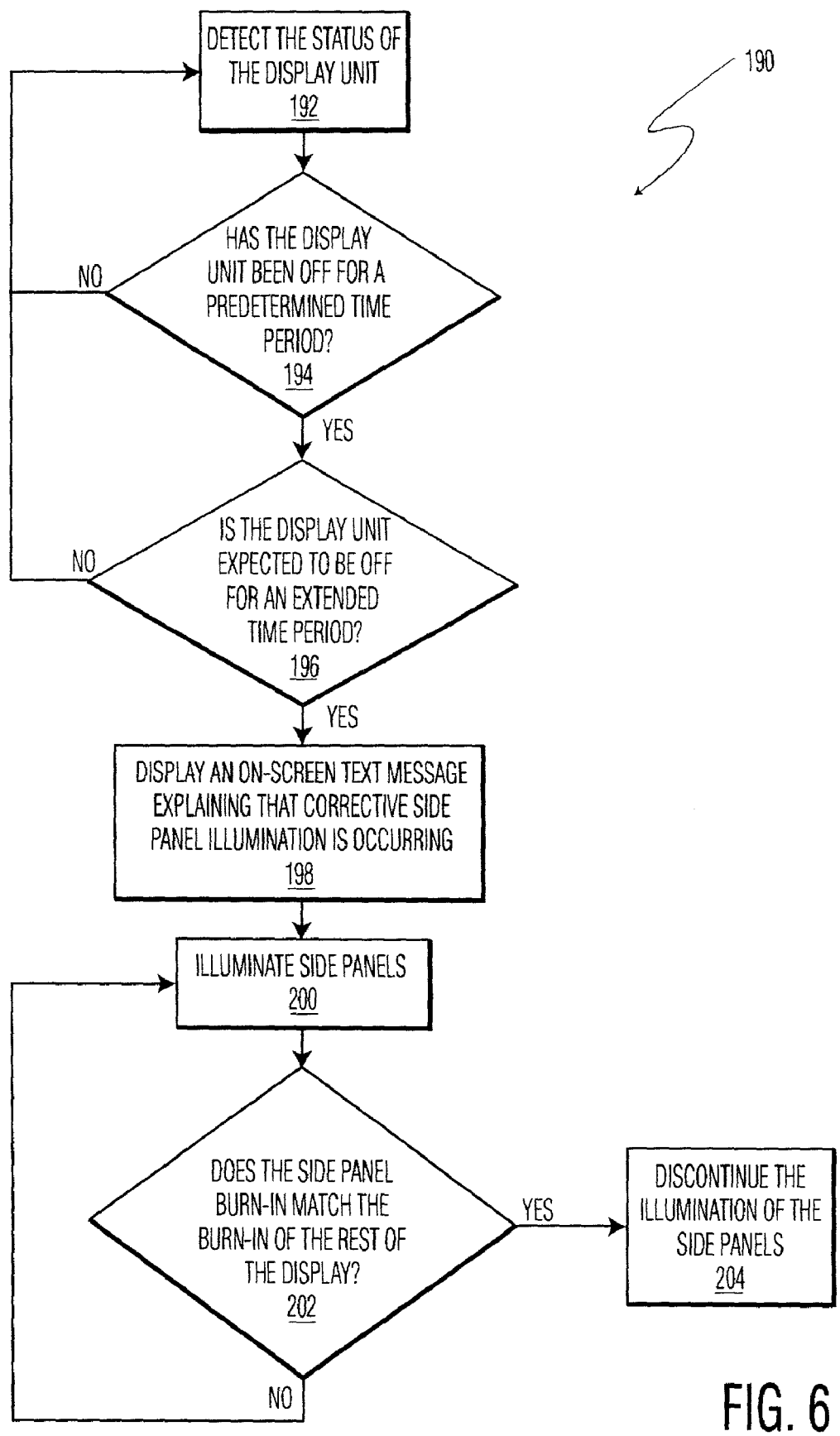
FIG. 6 is a flowchart illustrating the automatic scheduling mode of the present invention.

Referring now to FIG. 6, the automatic scheduling mode algorithm 190 of the present invention is shown. Initially, at step 192, controller 115 detects the status of display unit 75. If display unit 75 is off the controller 115, at step 194, determines if display unit 75 has been off for a predetermined time period (e.g., one hour). If display unit 75 has not been off for the predetermined time period, controller 115 returns to step 192 and continues to monitor the state of the display unit until the predetermined "off" time period is reached. If display unit 75 has been off for a predetermined time period, controller 115, at step 196, determines if display unit 75 is expected to remain off for an extended time period. In order to estimate when display unit 75 is expected to remain off for extended time periods controller 115 tracks the viewing habits of the users of the entertainment system by storing the times at which the display unit 75 is powered up and powered down, as well as the duration that display unit remains in the "off" and "on" states. If display unit 75 is not expected to remain off for an extended time period, controller 115 returns to step 192 and continues to monitor the state of the display unit until a subsequent predetermined "off" time period is reached. If display unit 75 is expected to remain off for an extended time period, controller 115, at step 198, displays an on-screen text message explaining that corrective side panel illumination is occurring. Afterwards, at step 200, controller 115 retrieves the side panel header and pixmap from memory 67, as discussed above, and passes the data to display processor 70 such that display processor 70 displays the side panels on display unit 75. Preferably, the side panels are initially displayed at a low brightness level (e.g., 15 IRE) for a first time period (e.g., the first hour), at a normal brightness level (e.g., 30 IRE) for a second time period (e.g., the second hour), and at a high brightness level (e.g., 60 IRE) for the remaining time that the side panels are displayed. This graceful increase in side-panel intensity minimizes a user's concern when the side panels appear to turn ON automatically. Next, at step 202, controller 115 determines if the aging of the display elements being utilized to display the side panels matches the aging of the rest of the display elements (i.e., the display elements used to display the content having a 4:3 aspect ratio). If the aging does match, controller 115, at step 204, discontinues the illumination of the side panels. If the aging does not match, controller 115 returns to step 200 and continues to illuminate the side panels. It should be noted that the illumination of the side panels may be discontinued prior to a desired aging for a number of reasons such as, but not limited to, a user turning display unit 75 on, if the current time comes within a predetermined time from an anticipated display unit "on" time, or a if there is a temporary loss of power. Preferably, if the user interrupts the corrective display of the side panels by turning display unit 75 on, a message informing the user of the corrective display is displayed to the user for a predetermined time (e.g., two minutes) or until the user dears the displayed message.

Figure 7:
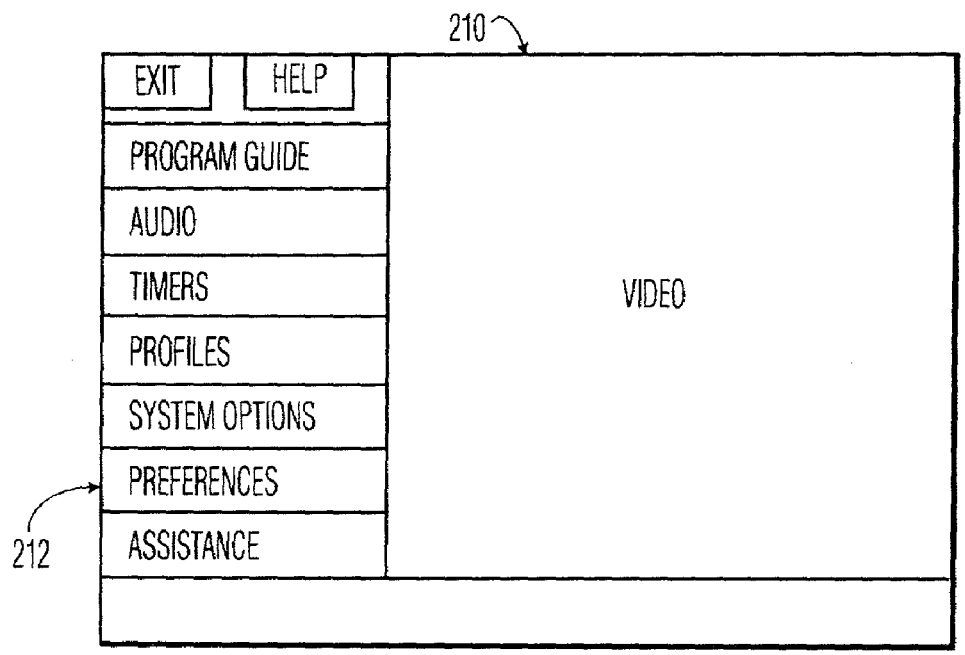
FIG. 7 is an exemplary graphical user interface configured to support the present invention.
Figure 8:
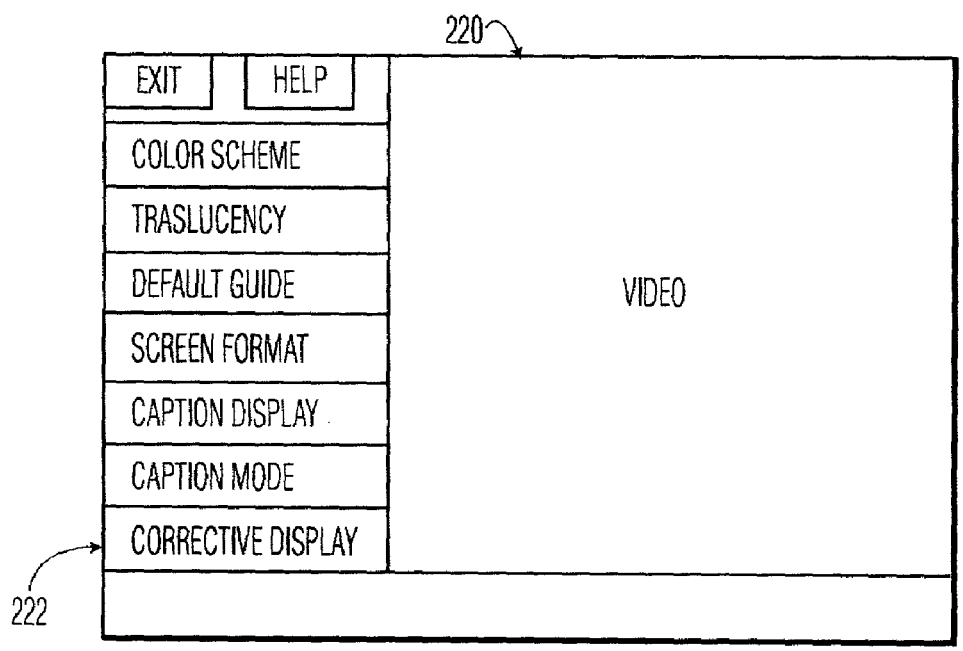
FIG. 8 is another exemplary graphical user interface configured to support the present invention.
Figure 9:
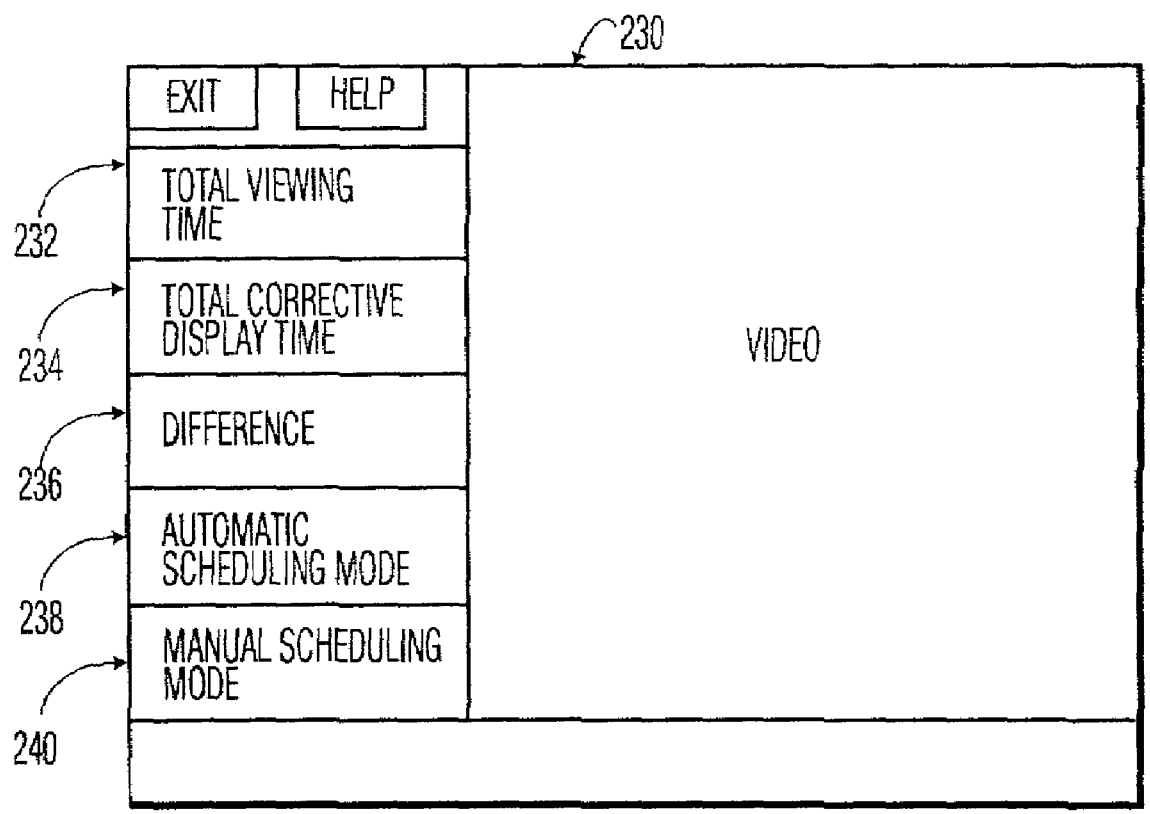
FIG. 9 is a further exemplary graphical user interface configured to support the present invention.

Referring now to FIGS. 7, 8, and 9, exemplary on-screen displays (OSDs) of a graphical user interface of the present invention are shown. By selecting various icons (via remote control 125) in the OSDs, displayed on display unit 75, a user can access video, audio, graphical and data content received from various sources (e.g., satellite, internet, or a local storage device). The user can also enable the automatic scheduling mode or the manual scheduling mode and adjust various mode features. Turning to FIG. 7, a main menu OSD 210 is shown. Main menu OSD 210 allows a user to access various program guides, set up various audio options, set timers, set custom profiles set system options and request assistance. Main menu also brings the user to a preference OSD when the user selects the preferences icon 212 of main menu OSD 210. Turning now to FIG. 8, an exemplary preference OSD 220 is shown. Preference OSD 220 allows a user to set up various user preferences such as, but not limited to, color schemes, translucency, default guides, screen formats, caption display and caption modes. The preference OSD 220 also brings the user to a corrective display OSD when the user selects the corrective display icon 222 of preference OSD 220.

Turning now to FIG. 9, the corrective display OSD 230 of the present invention is shown. The corrective display OSD 230 includes a "Total Viewing Time" icon 232, a "Total Corrective Display Time" icon 234, a "Difference" icon 236, an "Automatic Scheduling Mode" icon 238, and a "Manual Scheduling Mode" icon 240. When the user selects the "Total Viewing Time" icon 232 the total amount of viewing time that content having a 4:3 aspect ratio (or some other non 16:9 aspect ratio) was displayed on display unit 75 is shown to the user. When the user selects the "Total Corrective Display Time" icon 234 the total corrective display time of the side panels (or other corrective image) is shown to the user. When the user selects the "difference" icon 236 the difference between the 4:3 aspect ratio viewing time and the corrective side panel display time is shown to the user. The user can use this information to facilitate scheduling when setting the manual scheduling mode of the present invention. When the user selects the "automatic scheduling mode" icon 238 the user is provided with the option enabling or disabling the automatic scheduling mode of the present invention. When the user selects the "manual scheduling mode" icon 240 the user is provided with the options of enabling or disabling the manual scheduling mode, selecting the time and duration for displaying the corrective side panels, and selecting the brightness at which the corrective side panels are to be displayed (e.g., 15 IRE luminance for low brightness, 30 IRE luminance for normal brightness, and/or 60 IRE luminance for high brightness).

While the present invention has been described with reference to the preferred embodiments, it is apparent that various changes may be made in the embodiments without departing from the spirit and the scope of the invention, as defined by the appended claims. For example, the present invention is applicable to any display technology where uneven wear or aging occurs due to the format of displayed video content. Furthermore, using the display of corrective images to pre-age non-active video regions is also considered within the scope of the invention.

What is claimed is:

1. A method for maintaining even burn-in in a display unit having a plurality of display elements, the method comprising the steps of:
   identifying active display elements and non-active display elements on the display unit when video content is displayed on the display unit;
   monitoring an aging of the active display elements;
   detecting when the display unit is turned off;
   determining if the display is going to remain off for an extended time period by tracking a user's viewing habits, storing the times that the display is turned on and off, and storing each length of time that the display remains on and off; and
   displaying a corrective image on the identified non-active display elements if it is determined that the display is going to remain off for an extended time period.

2. The method of claim 1, wherein the step of identifying includes the steps of:
   detecting an aspect ratio of the video content;
   detecting an aspect ratio of the display unit;

comparing the video content aspect ratio to the display unit aspect ratio; and determining that the non-active display elements exist if the aspect ratio of the video content does not match the aspect ratio of the display unit.

3. The method of claim 2, wherein the aspect ratio of the video content is 4:3 and the aspect ratio of the display unit is 16:9.

4. The method of claim 2, wherein the aspect ratio of the video content is 16:9 and the aspect ratio of the display unit is 4:3.

5. The method of claim 1, wherein the step of monitoring includes the step of:

tracking the length of time that the active display elements are active.

6. The method of claim 1, wherein the step of determining if the display is going to be off for an extended time period further includes the step of:

comparing a current date and time to a user-selected start date and start time.

7. The method of claim 1, further comprising the step of:

terminating the corrective image display when an interruption event occurs.

8. The method of claim 7, wherein the interruption event is a user turning the display unit on.

9. The method of claim 7, wherein the interruption event is a scheduled corrective image display stop time.

10. The method of claim 9, wherein the stop time is set by the user.

11. The method of claim 9, wherein the scheduled stop time is derived from the user's viewing habits.

12. The method of claim 1, wherein the corrective image is displayed at one of a 15 IRE, 30 IRE, and 60 IRE luminance.

13. The method of claim 1, wherein the corrective image for a first time period is displayed at 15 IRE luminance, for a second time period is displayed at 30 IRE luminance, and for a third time period is displayed at 60 IRE luminance.

14. The method of claim 1, wherein the corrective image is a pair of side panels.

15. A system for equalizing display regions on a display unit, the system comprising:

means for identifying an active display region and an inactive display region on the display unit;

means for tracking a length of time that the active display region remains active;

means for detecting when the active display region becomes inactive;

means for determining if the active display region is going to remain inactive for an extended time period, said means for determining including means for tracking a user's viewing habits, means for storing the times that the active display region is active and inactive, and means for storing the length of time that the active display region remains active and inactive;

means for initiating the display of a corrective image on the inactive display region if it is determined that the active display region is going to remain inactive for an extended time period; and means for terminating the display of the corrective image after an occurrence of an interruption event.

16. The system of claim 15, wherein the means for determining if the active display region is going to be inactive for an extended time period further includes a means for comparing a current date and time to a user-selected start date and start time.

17. The system of claim 15, wherein the interruption event is a user turning the display unit on.

18. The system of claim 15, wherein the interruption event is a scheduled corrective image display stop time.

19. The system of claim 18, wherein the stop time is set by the user.

20. The system of claim 18, wherein the stop time is derived from the user's viewing habits.

21. The system of claim 15, wherein the corrective image is displayed at one of a 15 IRE, 30 IRE, and 60 IRE luminance.

22. The system of claim 15, wherein the corrective image for a first time period is displayed at 15 IRE luminance, for a second time period is displayed at 30 IRE luminance, and for a third time period is displayed at 60 IRE luminance.

23. The system of claim 15, wherein the corrective image is a pair of side panels.

24. The system of claim 15, wherein said means for initiating the display further comprises means for initiating display of an onscreen text message.

25. The method of claim 1, wherein said displaying a corrective image further comprises displaying an on screen text message.

26. A method for maintaining even burn-in in a display unit having a plurality of display elements, the method comprising the steps of:

identifying active display elements and non-active display elements on the display unit when video content is displayed on the display unit;

monitoring an aging of the active display elements;

detecting when the display unit is turned off;

determining if the display is going to remain off for an extended time period based on the user's viewing habits; and displaying a corrective image on the identified non-active display elements if it is determined that the display is going to remain off for an extended time period.

27. A system for equalizing display regions on a display unit, the system comprising:

means for identifying an active display region and an inactive display region on the display unit;

means for tracking a length of time that the active display region remains active;

means for detecting when the active display region becomes inactive;

means for determining if the active display region is going to remain inactive for an extended time period based on a user's viewing habits;

means for initiating the display of a corrective image on the inactive display region if it is determined that the active display region is going to remain inactive for an extended time period; and means for terminating the display of the corrective image after an occurrence of an interruption event.

* * * * *